United States Patent [19]
Righele

[11] Patent Number: 5,156,566
[45] Date of Patent: Oct. 20, 1992

[54] MACHINE FOR THE SEPARATION OF ONE CONTINUOUS SAUSAGE INTO INDIVIDUAL SAUSAGES

[76] Inventor: Giovanni B. Righele, Via Tiziano, 5, 36010 Zane' (Vicenza), Italy

[21] Appl. No.: 846,123

[22] Filed: Mar. 4, 1992

[30] Foreign Application Priority Data

Mar. 11, 1991 [IT] Italy ............................ MI91A000644

[51] Int. Cl.$^5$ .......................................... A22C 11/00
[52] U.S. Cl. ........................................ 452/46; 452/49
[58] Field of Search .............................. 452/46, 48, 49

[56] References Cited

U.S. PATENT DOCUMENTS

| | | | |
|---|---|---|---|
| 4,463,477 | 8/1984 | Ziolko | 452/49 |
| 4,549,330 | 10/1985 | Ziolko | 452/46 |
| 4,821,485 | 4/1989 | Evans et al. | 452/49 |

FOREIGN PATENT DOCUMENTS

| | | |
|---|---|---|
| 69544 | 9/1986 | European Pat. Off. . |
| 109801 | 3/1987 | European Pat. Off. . |
| 1078744 | 10/1957 | Fed. Rep. of Germany ........ 452/46 |

Primary Examiner—Willis Little
Attorney, Agent, or Firm—Eckert Seamans Cherin & Mellott

[57] ABSTRACT

The machine comprises a rotary drum provided with a circumferential series of twisting and cutting parts arranged along generatrices of the drum. The twisting parts are composed of pairs of male-female pliers made to translate relatively between an open position and a closed position and with partially telescoping of the same. The cutting parts are composed of sliding knives normally housed in corresponding recesses of one of the pliers and which can be driven to project therefrom to cut the continuous sausage when the pliers are in the closed position.

4 Claims, 5 Drawing Sheets

MACHINE FOR THE SEPARATION OF ONE CONTINUOUS SAUSAGE INTO INDIVIDUAL SAUSAGES

The present invention relates to a machine for the separation of one continuous sausage into individual sausages.

The practice of producing sausages in the form of chains of individual elements or portions of product is known.

During production these chains are formed from a single casing containing sausage meat, which is divided into sausages generally constant in length by means of corresponding narrowing of the extremities. These narrowings are composed of short stalks around which a string is wound and made to pass along the whole continuous sausage and in this way serves as a separator element between pairs of adjacent sausages in the chain.

The resulting product is thus marketed in the form of a chain of sausages. Purchase involves the separation by hand of an end portion of chain comprising a required number of sausages, achieved by cutting the joining stalk between said end portion and the rest of the chain.

Hygiene, storage and practical reasons have now prompted the idea of marketing the product already divided into sausages arranged in a variable number in practical trays, such as, for example, those normally used for packaging fruit and vegetables in supermarkets.

Devices for the separation of one continuous sausage into individual sausages are known.

European patent no. 0069544, filed in the name of DEVRO,INC on Jul. 1st 1982, illustrates a device comprising a rotary drum fitted with radial support brackets for pairs of scissor-type forming arms which can be opened and closed by a system of cam and feeler pins. At least one of the forming arms of each pair has an opening directed towards the other arm to receive a continuous sausage to subject to narrowing at a stalk separating adjacent sausages. At the internal extremity of the opening there is a narrow groove with a cutting edge for cutting the continuous sausage on completion of the closure movement of the forming arms.

European patent no. 0109801, filed in the name of DEVRO, INC on Nov. 9th 1983, illustrates a device which is moreover similar to the previous one, but wherein a forming arm has a pair of distanced cutting arms and the other forming arm is provided with an anvil with cutting edges which is inserted between the abovementioned cutting elements to cut the stalk which connects one sausage to the other.

In both devices the forming arms are placed side by side. This leads to the formation of relatively long stalks which, when the forming arms close, tend to adopt an oblique arrangement, thus rendering their cutting difficult and the perfect closure of the extremities of the sausages problematical unless special devices are used which complicate the structure and increase the cost of the device.

Furthermore a separator device has been in existence for more than twenty years, produced by the firm FAMCO, which uses pliers and rollers for cutting and twisting the stalk between adjacent sausages of the same continuous sausage. This machine is however extremely complicated and requires yearly overhauling.

The object of the present invention is to provide a machine for the separation of a continuous casing into individual sausages which is both simple and whose maintenance is easy and which works in such a way as to ensure a perfect cut of the stalks and a perfect closure of the extremities of the sausages to prevent the product contained therein from escaping.

In accordance with the invention this object is achieved by means of a machine for separating one continuous sausage into individual sausages, comprising a rotary drum provided with a circumferential series of twisting and cutting parts arranged along generatrices of said drum, characterised in that said twisting parts are composed of pairs of male-female pliers caused to translate relatively between an open position and a closed position and with partial telescoping of the same; said cutting parts consist of sliding knives normally housed in corresponding recesses of one of said pliers and which can be driven to project therefrom to cut the continuous sausage when said pliers are in the closed position.

In this way it is possible to form short stalks separating the sausages, which, when the cutting knife is actuated, are held tightly and straight between the co-operative pliers, so as to ensure a perfect cut into individual sausages which are fully closed at their extremities.

The features of the present invention shall be explained further by its embodiment, illustrated by way of an example and not limiting, in the accompanying drawings, in which.

Figure 1:
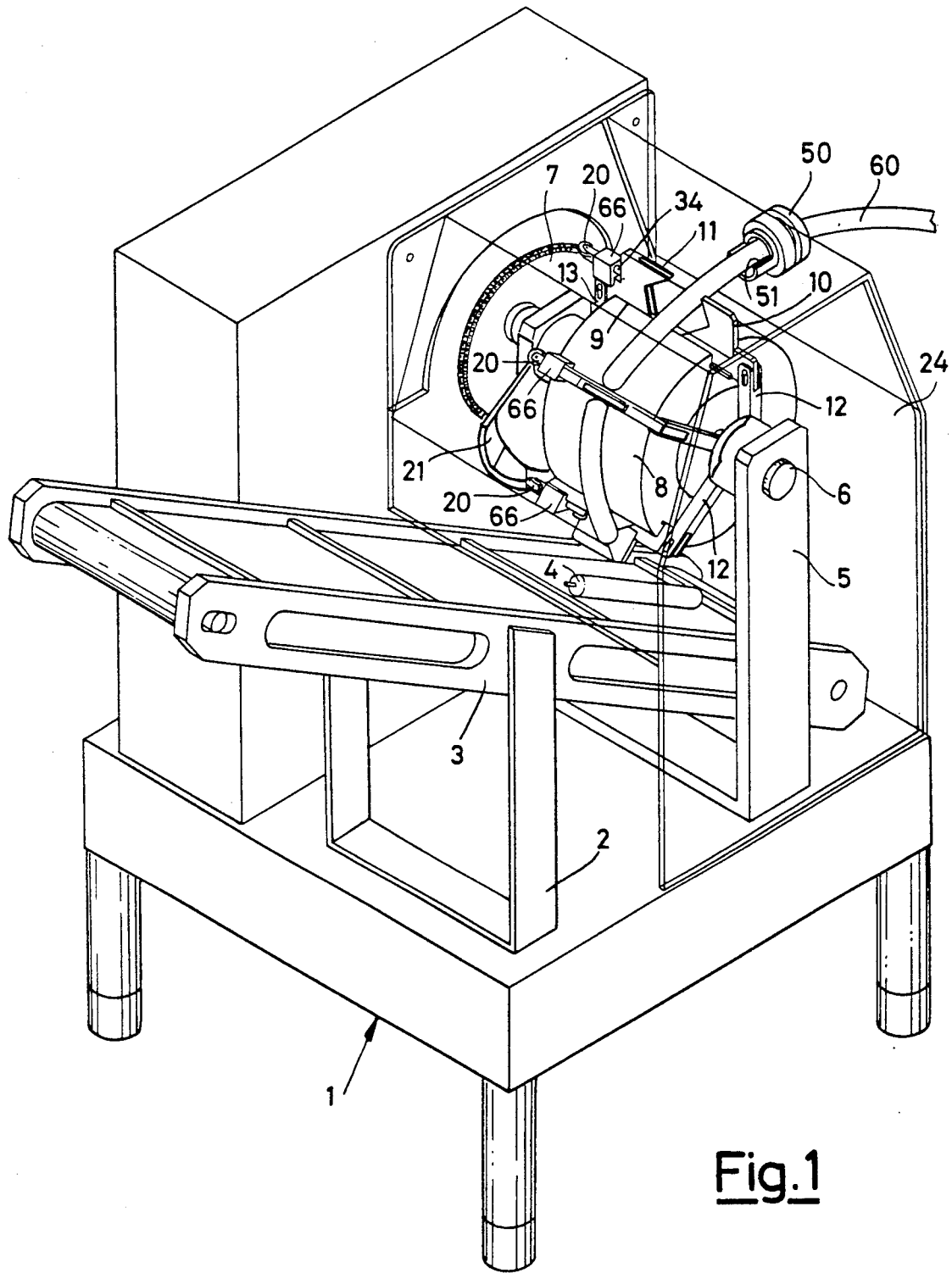
FIG. 1 is a perspective view of the machine according to the invention.

With reference to FIG. 1, the machine comprises a framework 1 for holding a support 2 for a conveyor belt 3 of individual sausages 4 and a support 5 for a rotating shaft 6 driven by a motor (not shown) by means of a chain and gearwheel transmission 7 and designed to support rotatively a drum 8. The latter is entirely contained in a protective casing 24 provided with a side hole 51 with a protective bush 50 for feeding a continuous sausage 60 to be divided into individual sausages and moreover open on the opposite side for the conveyor belt 3 to pass through.

The drum 8 is provided with grooves 9 distributed along circumferentially distanced generatrices of its lateral surface. Each groove 9 houses a pair of male-female translatable pliers 10, 11.

Figure 7:
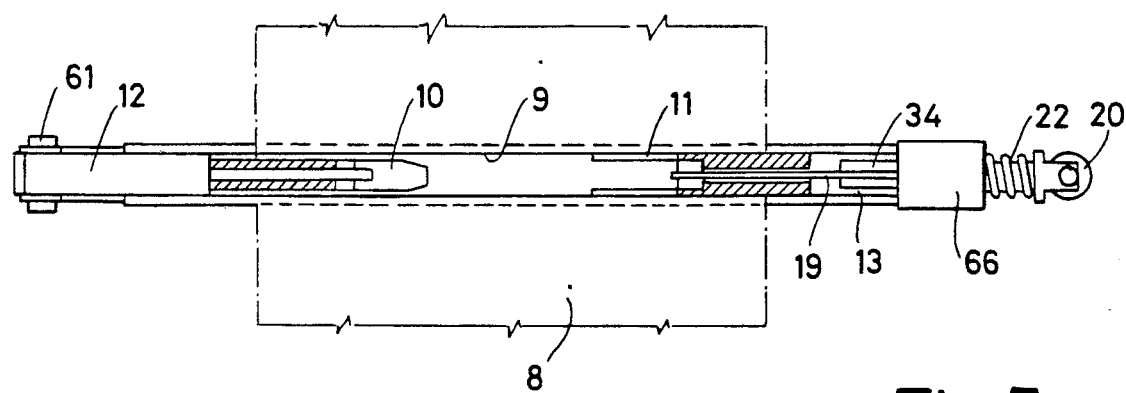
FIG. 7 is a section along line VII–VII of FIG. 3.

As shown in FIG. 7, a sliding knife 19 for cutting the product is housed inside the female plier 11 of each pair of male-female pliers 10, 11.

With reference to FIGS. 3, 4, 5, 6 the pliers 10, 11 of each pair are connected to feeler pins 14, 15 by means of levers 12, 13 with fulcrum in 61, 62 on brackets 63, 64 fixed to the rotary drum 8. Positioned between the levers 12, 13 of each pair of pliers 10, 11 is a connecting spring 18, which passes through an axial hole 65 of the drum 8 and forces the pliers one towards the other. The assembly of feeler pins 14 connected to the male pliers 10 and that of the feeler pins 15 connected to the female pliers 11 are engaged with the front, shaped surface of corresponding circular cams 16, 17, identical one to another and attached to the supports 5 around the shaft 6.

Each knife 19 is in turn restrained to a rear shank 34 which is supported slidingly by a support 66 sliding in the groove 9 and kinetically restrained in 67 to the nearby lever 13 (FIGS. 3-6). At its rear extremity the shank 34 holds a feeler pin 20 engaged with the front, shaped surface of cam 21 attached to the support 5 and provided with a return spring 22 which maintains it normally in the withdrawn rest position of FIGS. 3-5 and 7.

Figure 8:
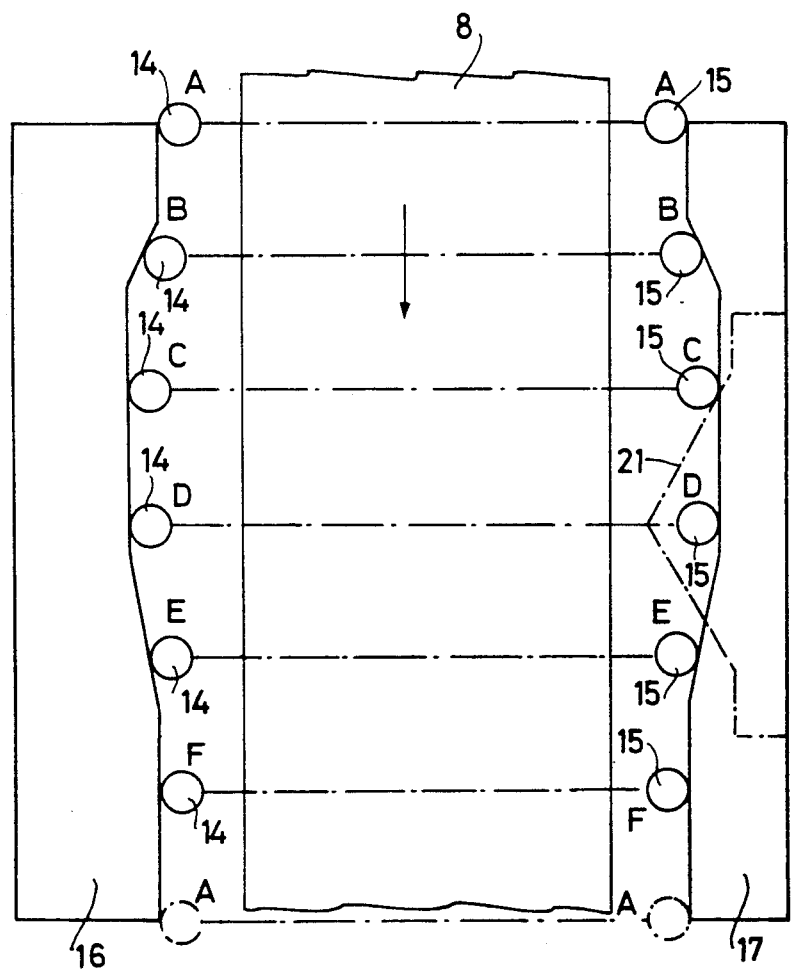
FIG. 8 illustrates axial developments of cams for guiding the pliers and the cutting knives.

The development of the cams 16, 17 and that of the cam 21, both shown in FIG. 8, are such as to guide the translation of the pairs of pliers 10 11 along the grooves 9 and drive the knife 19 according to the working cycle described hereinbelow.

Figure 2:
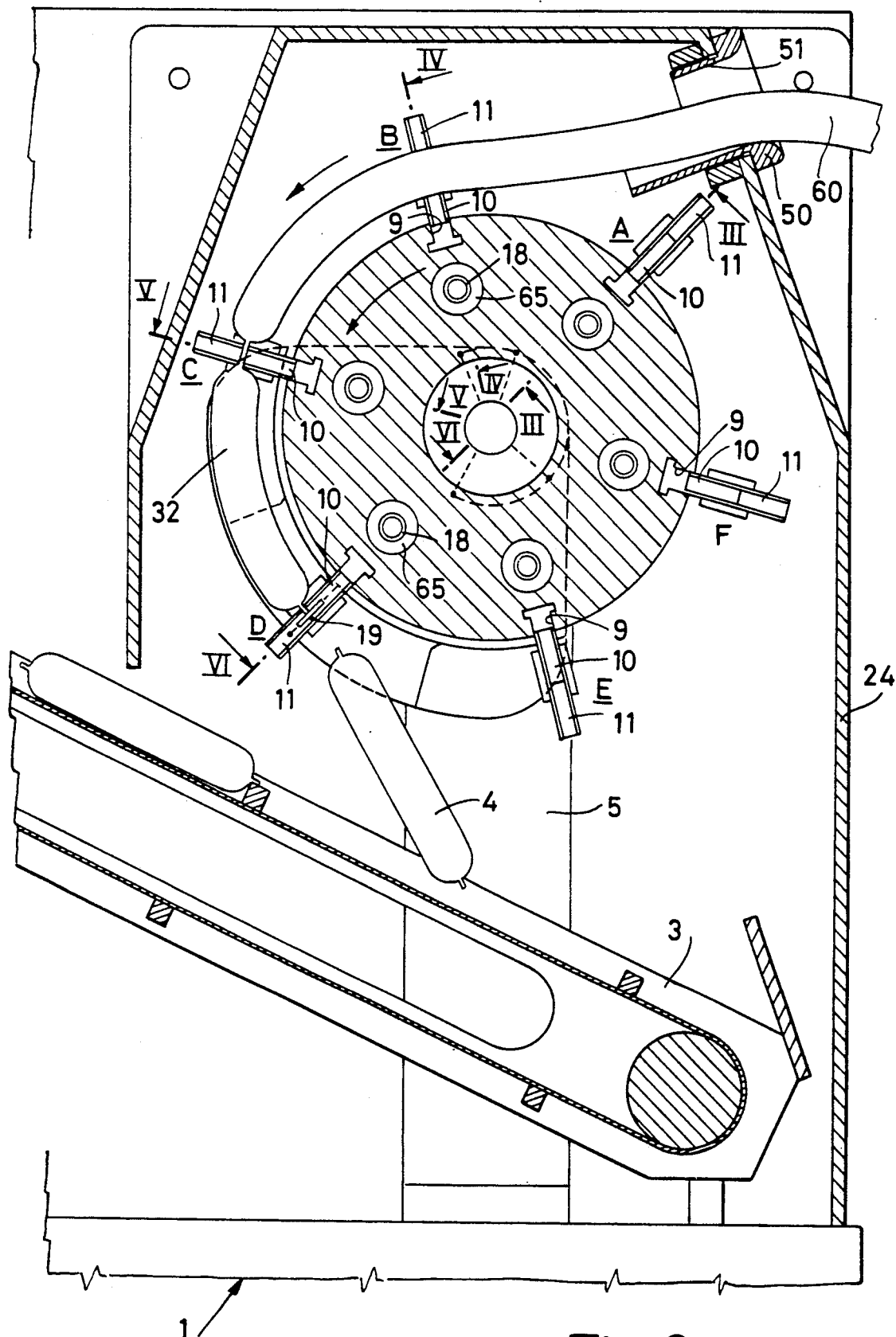
FIG. 2 is a longitudinal section of the machine illustrated in FIG. 1.
Figure 3:
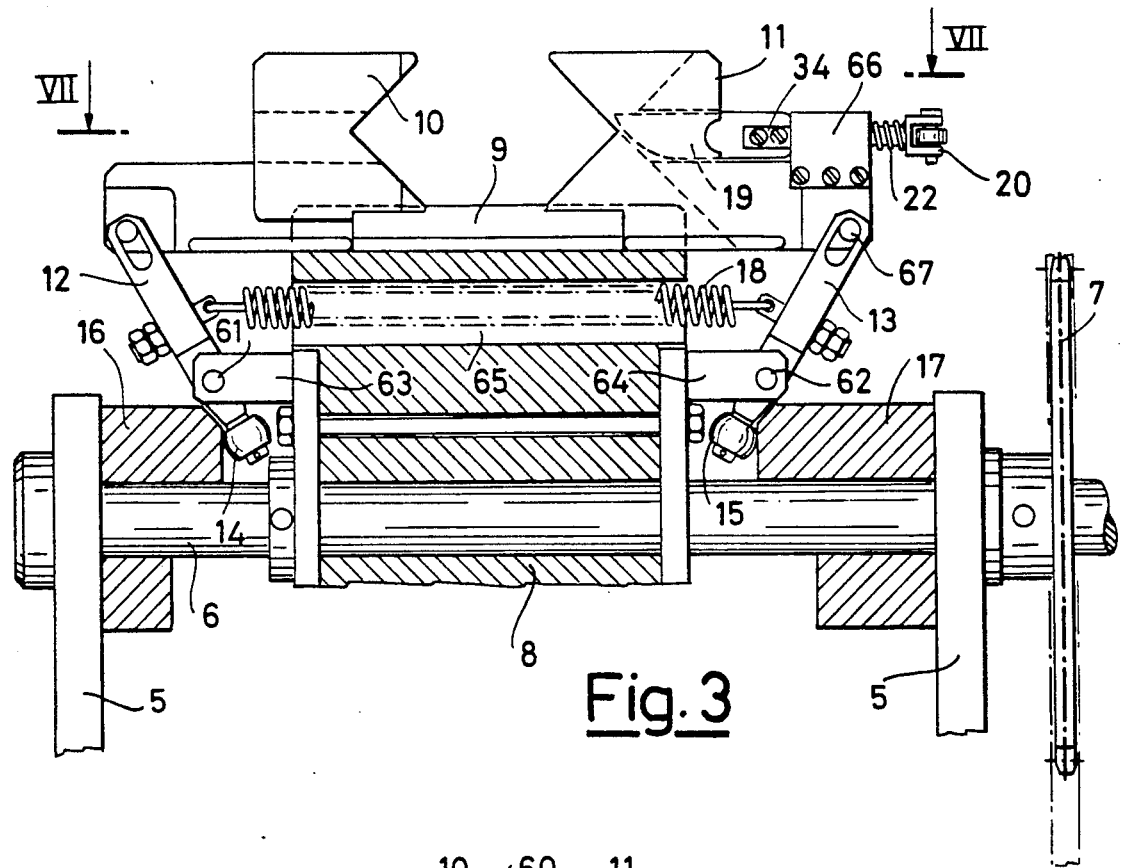
FIGS. 3, 4, 5, 6 are sections of the drum of the abovementioned machine along lines III–III, IV–IV, V–V, VI–VI of FIG. 2.
Figure 4:
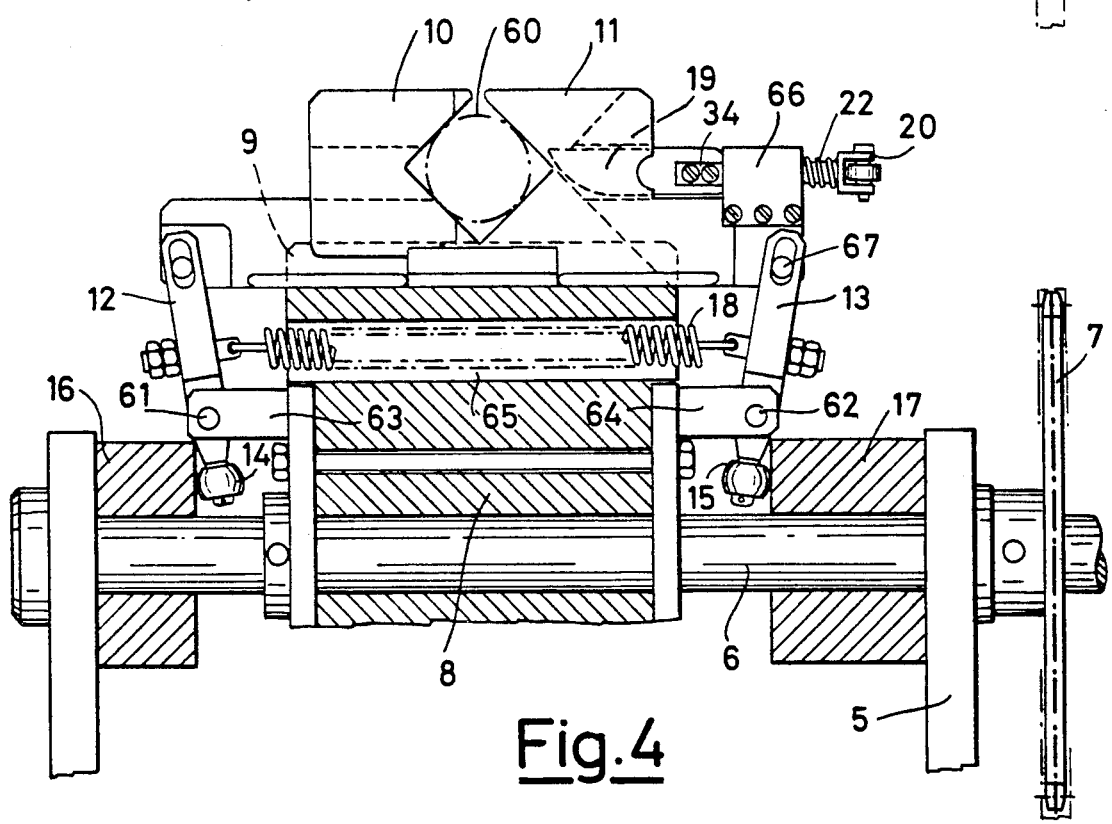
Figure 5:
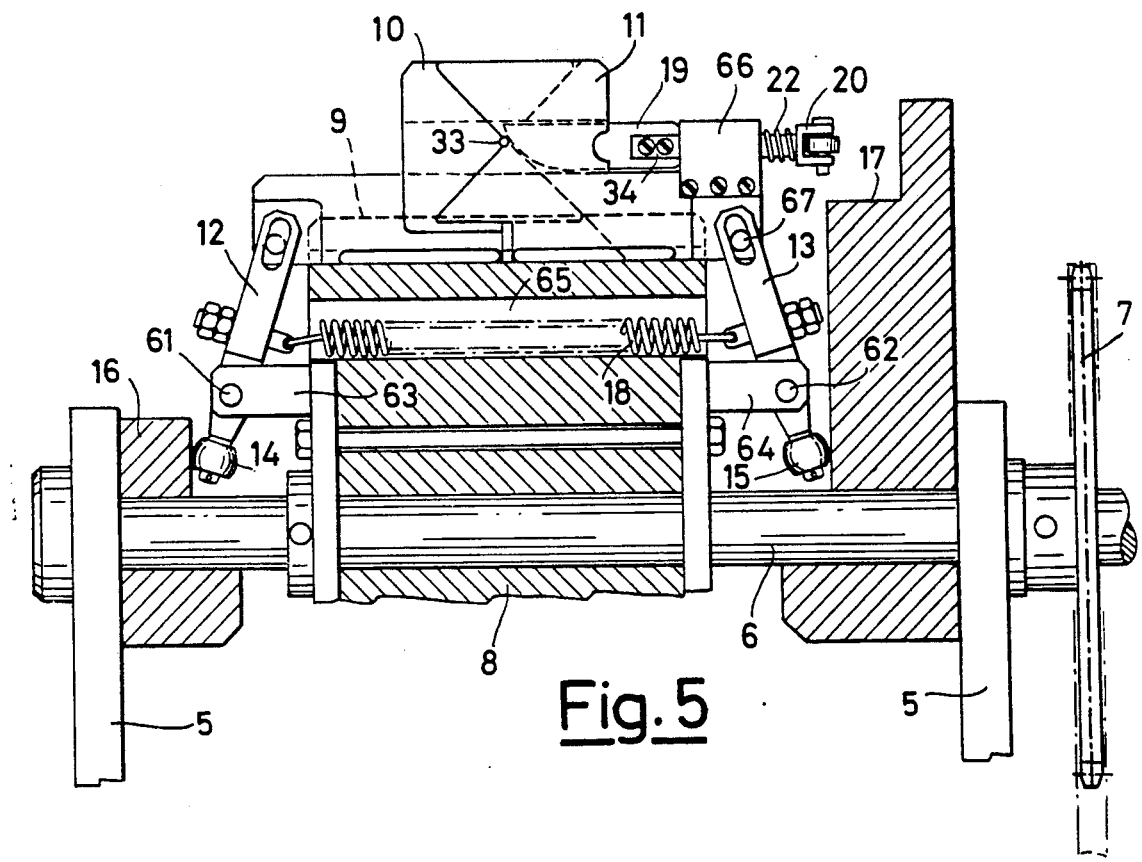
Figure 6:
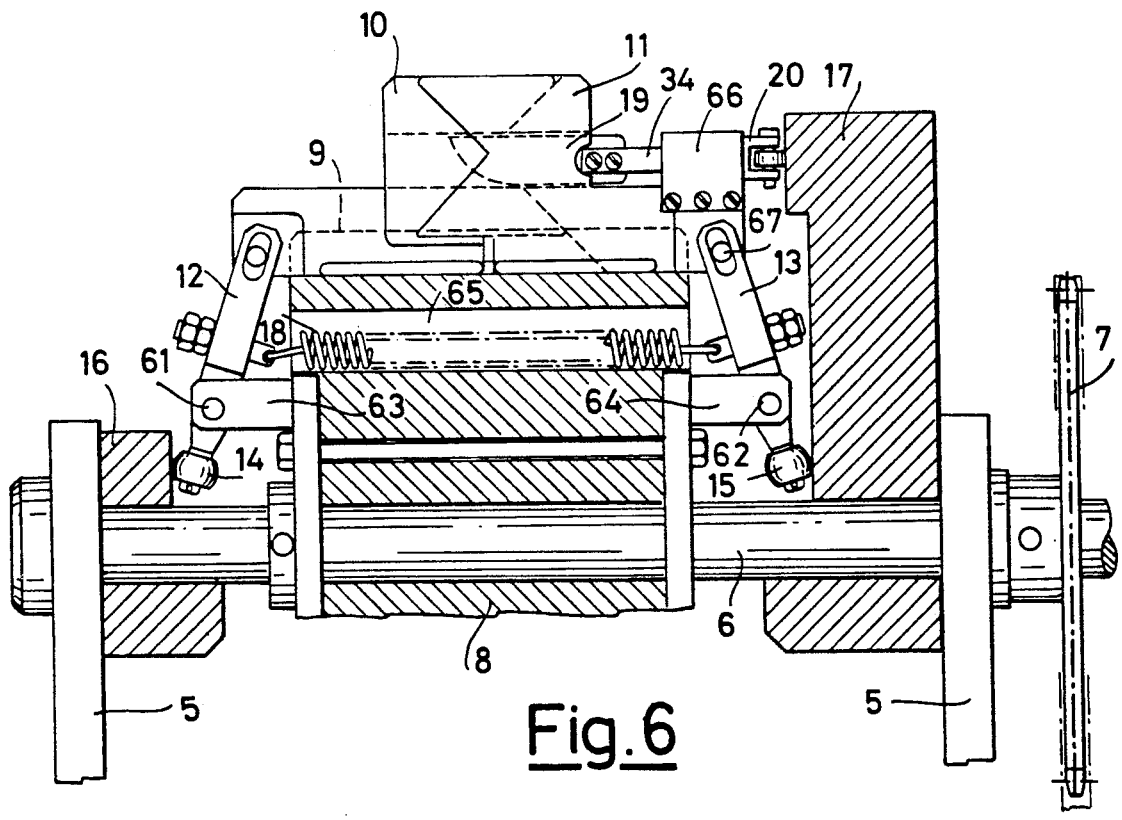

Each pair of pliers 10, 11 is made to rotate starting from an open position, illustrated in FIG. 3, wherein the feeler pins 15, 14 are in position A of FIG. 8 and the respective pliers 11, 10 in the corresponding position A of FIG. 2, to a semi-closed position illustrated in FIG. 4, in which the feeler pins 15, 14 and the pliers 11, 10 are in position B of FIGS. 8 and 2, to a closed position illustrated in FIG. 5 in which the feeler pins 15, 14 and the pliers 11, 10 are in position C of FIGS. 8 and 2, to a cutting position, characterised by the projection of the knife 19, illustrated in FIG. 6 in which the feeler pins 15, 14 and the pliers 11, 10 are in position D of FIGS. 8 and 2. The pair of pliers 11, 10 is then made to pass through a semi-open position in which the feeler pins 15, 14 and the pliers 11, 10 are in position E of FIGS. 8 and 2, and then through a fully open position in which the feeler pins 15, 14 and the pliers 11, 10 are in position F of FIGS. 8 and 2 to finally return to the position A described hereinabove.

Consequently, the machine illustrated in the drawings is intended to function as follows.

It should first of all be noted that, since this is a continuous cycle machine and since the pairs of pliers 10, 11 are distanced by circumference arcs of the same length, FIG. 2, in addition to representing an instant of functioning of the machine with six pairs of pliers 10, 11, also represents the different positions A-F occupied by the various pairs of pliers 10, 11 during rotation of the drum 8, to which the same number of working conditions of the pliers themselves correspond.

During rotation of the drum 8, each pair of pliers 10, 11 first of all passes through the open position A and then proceeds, still open, to allow the positioning of the continuous sausage 60, fed through the hole 51 of the protective casing 24. It then moves into the semi-closed position B beyond which the continuous sausage casing 60 begins to be compressed in order to be divided into portions 32 by means of the formation of a separating stalk 33, which occurs in the closed position C. From the latter position it moves into the cutting position D in which the cam 21 actuates the projection of the knife 19 from the recess 23 to cut the stalk 33 and the consequent formation of the individual sausages 4. Once the stalk 33 has been cut, the individual sausage 4 falls onto the conveyor belt 3. The pair of pliers 10, 11, free from the product, rotate through position E, in which the pair of pliers 10, 11 is in the semi-open condition, with the knife 19 withdrawn into the recess 23, and the position F in which the pair of pliers is in the open condition. Finally the pair of pliers returns to cycle start position A.

It should be noted that during the phase of forming the stalk 33, the partial telescoping of the male-female pliers 10, 11 of each pair ensures that the stalk 33 is maintained completely straight between the side walls of the female part 11 and thus ensures a perfectly formed cut.

It should likewise be observed that the pliers 10, 11 of each pair have a width and a special "V" configuration so as to create a stalk 33 which is short and well-twisted to avoid the product escaping after cutting. More particularly the cut is made exactly at the centre of the stalk 33 itself.

It should finally be noted that, by varying the number of pairs of pliers on the drum, and hence their reciprocal distance, the length of the individual sausages varies correspondingly.

I claim:

1. Machine for the separation of one continuous sausage into individual sausages, comprising a rotary drum provided with a circumferential series of twisting and cutting parts arranged along generatrices of said drum, characterised in that said twisting parts are composed of pairs of male-female pliers made to translate relatively between an open position and a closed position and with partial telescoping of the same and said cutting parts are composed of sliding knives normally housed in corresponding recesses of one of said pliers and can be actuated to project therefrom for the cutting of the continuous sausage when said pliers are in the closed position.

2. Machine according to claim 1, characterised in that said pairs of pliers are driven to translate by elastically urged first lever means provided with respective feeler pins co-operative with first fixed cam means.

3. A machine according to claim 2, characterised in that said cutting parts are slidingly supported by support means sliding together with the respective pairs of pliers and are moreover driven to translate with respect to said support means by second elastically urged lever means provided with feeler pins co-operative with said second fixed cam means.

4. Machine according to claim 3, characterised in that said first cam means are shaped so as to actuate a complete closure and opening cycle of the pairs of pliers during a rotation of the drum and said second cam means are shaped so as to actuate a single cutting operation of said cutting parts while said pairs of pliers are in the fully closed position.

* * * * *